(12) United States Patent
Sun et al.

(10) Patent No.: US 9,001,424 B2
(45) Date of Patent: Apr. 7, 2015

(54) OPTICAL FILM COMPOSITE APPLICABLE IN A DIRECT TYPE BACK LIGHT MODULE

(75) Inventors: Yu-Ming Sun, Kaohsiung (TW); Shih-Jung Chen, Kaohsiung (TW); Chin-Yi Liao, Kaohsiung (TW); Pei-Hsin Chen, Kaohsiung (TW)

(73) Assignee: Eternal Materials Co., Ltd., Kaohsiung (TW)

( * ) Notice: Subject to any disclaimer, the term of this patent is extended or adjusted under 35 U.S.C. 154(b) by 629 days.

(21) Appl. No.: 12/912,639

(22) Filed: Oct. 26, 2010

(65) Prior Publication Data

US 2011/0096402 A1  Apr. 28, 2011

(30) Foreign Application Priority Data

Oct. 27, 2009 (TW) ................. 98136326 A

(51) Int. Cl.
*G02B 5/02* (2006.01)
*G02B 1/04* (2006.01)
*G02F 1/1335* (2006.01)

(52) U.S. Cl.
CPC ............. *G02B 1/04* (2013.01); *G02F 1/133606* (2013.01); *G02F 2001/133507* (2013.01)

(58) Field of Classification Search
None
See application file for complete search history.

(56) References Cited

U.S. PATENT DOCUMENTS

| 6,280,063 | B1 * | 8/2001 | Fong et al. .................... 362/333 |
| 7,833,622 | B2 | 11/2010 | Hsu |
| 7,972,689 | B2 * | 7/2011 | Hsu et al. ..................... 428/323 |
| 8,456,590 | B2 * | 6/2013 | Hamada et al. ................. 349/64 |
| 2007/0127127 | A1 * | 6/2007 | Hsu et al. ..................... 359/599 |
| 2007/0139782 | A1 * | 6/2007 | Ito et al. ...................... 359/599 |
| 2008/0055937 | A1 * | 3/2008 | Chuang et al. ................ 362/627 |
| 2008/0247190 | A1 | 10/2008 | Shiau |
| 2009/0324890 | A1 | 12/2009 | Wu |
| 2011/0051247 | A1 | 3/2011 | Kim |
| 2013/0121021 | A1 * | 5/2013 | Lin et al. ...................... 362/606 |

FOREIGN PATENT DOCUMENTS

| CN | 1791829 A | 6/2006 |
| CN | 1834752 A | 9/2006 |
| CN | 201017139 Y | 2/2008 |
| CN | 201210209 Y | 3/2009 |
| EP | 1072929 A1 | 1/2001 |
| WO | WO 2008084744 A1 * | 7/2008 |

* cited by examiner

*Primary Examiner* — Arnel C Lavarias
(74) *Attorney, Agent, or Firm* — Shimokaji IP

(57) ABSTRACT

An optical film composite includes a brightness enhancement element and a light diffusion element, wherein the light diffusion element includes a substrate with a light diffusion layer on at least one side thereof, and wherein the light diffusion element has a haze of no less than 98% as measured according to JIS K7136 standard method.

24 Claims, 8 Drawing Sheets light incident surface light incident surface light incident surface light incident surface light incident surface light incident surface light incident surface light incident surface light incident surface light incident surface

OPTICAL FILM COMPOSITE APPLICABLE IN A DIRECT TYPE BACK LIGHT MODULE

BACKGROUND OF THE INVENTION

1. Field of the Invention

The present invention relates to an optical film composite, and in particular, to an optical film composite applicable in a direct type back light module, especially a direct type LED back light module.

2. Description of the Prior Art

Liquid crystal displays (LCDs) have advantages of high image quality, low radiation, low power consumption, and good space utilization, and thus gradually replace the existing cathode-ray tube (CRT) display and become popular in the market. The main structure of the LCD includes two parts, that is, a liquid crystal panel and a back light module. As the liquid crystal panel does not emit light, the back light module is required to provide a light source needed for displaying images by the LCD, to enable the LCD to display images normally.

One of commonly used light sources of the back light module is a cold cathode fluorescent lamp (CCFL). In a direct type back light module, the lamps are disposed in parallel under the liquid crystal panel, and if the light is not suitably diffused and uniformized suitably, obvious lamp contour is easily caused on the display screen due to non-uniform distribution of light intensity, and thus the imaging quality is reduced. Furthermore, the higher the demand on brightness is, or the larger the size of the display is, the higher the number of the lamps that are needed is, and the more serious the emerged mura phenomenon is. Therefore, it becomes a major bottleneck in development in the field of LCD.

Another light source applicable in the back light module is a light emitting diode (LED). Due to the advantages of low power consumption, high brightness, and no pollution of LEDs, the back light module using LEDs as the light source has become one of the important research and development directions at present. However, as the LEDs are point light source and have high directionality, hot spot effect easily occurs. Therefore, if the light of the back light module using LEDs as the light source is not diffused and uniformized suitably, the mura phenomenon easily occurs. One solution for this problem is to increase the number of the LEDs to reduce the pitch among the LEDs. However, by this manner, the number of the LEDs is significantly increased, such that the overall cost is increased, and excessively heat is generated, and thus the service life and quality of other components are impacted. Meanwhile, the power consumption is high, so that the requirements for batteries to provide power by many portable devices cannot be met.

Generally speaking, the back light modules are divided into direct type back light modules and side type back light modules. Compared with the side type back light module, the direct type back light module is capable of providing high brightness, so that when the brightness requirement for the light source is high or being applied to a largely sized display device, the direct type back light module is commonly adopted. Furthermore, the direct type LED back light module uses the local dimming technology, and thus being more power saving, and meeting the environmental protection requirements; however, in order to eliminate the hot spot effect, the distance between the light source and the film sheet needs to be increased so as to provide an adequate light mixing distance, and as a result, the thickness of the back light module is increased, which is not of benefit to the demand of lightening and thinning of the displays.

Accordingly, the inventors of the present invention, through extensive researches and repeated experiments, invented an optical film composite including a light diffusion element having high diffusion properties and a brightness enhancement element. The optical film composite of the present invention is applicable to a direct type LED back light module of a large size display without increasing the light mixing distance, achieves the light uniformization effect, has the advantages of simple process, high yield, and ease of use, and can solve the problems existing in the art.

SUMMARY OF THE INVENTION

The present invention is mainly directed to an optical film composite, which comprises a brightness enhancement element and a light diffusion element, wherein the light diffusion element comprises a substrate having a light diffusion layer on at least one side thereof and the light diffusion element has a haze of no less than 98% as measured according to JIS K7136 standard method.

The optical film composite of the present invention has a light uniformization effect, is capable of effectively diffusing the light, eliminating the non-uniform brightness (mura) phenomenon, thereby providing a high imaging quality.

DETAILED DESCRIPTION

Figure 1A:
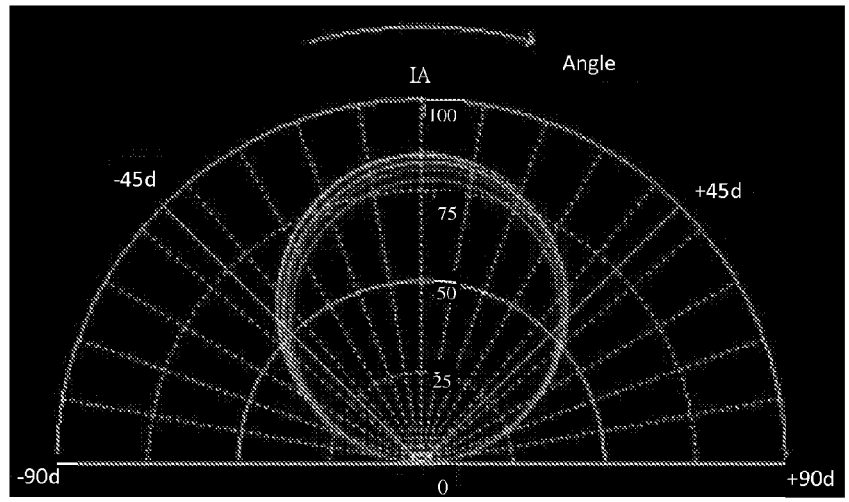
FIG. 1 is a luminosity diagram of a light diffusion element 2 measured with an automatic goniophotometer (FIG. 1a: incident angle 0-40°, and FIG. 1b: incident angle 50-80°)

The terms used herein are only used to describe the implementation aspects, but not intended to limit the protection scope of the present invention. For example, term "a (an)" used in the specification covers the singular and plural forms, unless otherwise clearly stated.

The brightness enhancement element is not particularly limited, and mainly used to improve the light utilization to achieve the effect of brightness enhancement, and may be any brightness enhancement elements well known to those of ordinary skill in the art of the present invention. Generally speaking, the brightness enhancement elements are divided into four types. The first type is a light concentrating film, and the principle is to refract and/or totally internally reflect the incident light with a special optical structure by using an optical structure layer to control the light emitting angle of the incident light, such that the original light scattered towards all directions is concentrated, and thus the light loss rate is reduced and the purpose of brightness enhancement is achieved. Examples of the commercially available light concentrating film include: the light concentrating film of model BEF (Brightness Enhancement Film) available from 3M Company; the light concentrating film of model PTR-763 available from SHINWHA; the light concentrating film of model HGP210 available from Gamma Company; the light concentrating film of model LSF-451B available from LG Chemical Company; or the light concentrating film of model M268Y available from Mitsubishi Rayon Company. The second type is a multi-layered reflective polarized light recycling film, and the principle is to form a multi-layered film structure with two polymer materials with different refractive indexes through co-extrusion technology, to generate the birefringence characteristic through extension. When light passes through, the polarized light in the perpendicular direction can directly penetrate through, while the polarized light in the parallel direction will be reflected back to the back light module, and then reflected to form polarized light in the perpendicular direction to penetrate the multi-layered reflective polarized light recycling film, and thus the light utilization is improved, and the effect of brightness enhancement is achieved. Examples of the commercially available multi-layered reflective polarized light recycling film include: the multi-layered reflective polarized light recycling film of model DBEF-D2-280 available from 3M Company). The third type is a chiral-nematic liquid crystal brightness enhancement film, and the principle is a reflective type brightness enhancement technology, mainly includes that when a light source of a back light module passes through the chiral-nematic liquid crystal layer, only the circularly polarized light reverse to the liquid crystal molecular spiral structure may pass through, and the circularly polarized light identical to the liquid crystal molecular spiral structure will be reflected to the back light module, and then reflected to form the circularly polarized light reverse to the liquid crystal molecular spiral structure, so as to penetrate the chiral-nematic liquid crystal layer, and thus the light utilization is improved, and the effect of brightness enhancement is achieved. The examples include cholesteric liquid crystal brightness enhancement film. The fourth type is a wire-grid polarizer (WGP), by using a nano microstructure having a width smaller than a wavelength of light waves, the light is polarized after input, and then with a suitable optical element, the polarized light is recycled, and thus the effect of brightness enhancement of the method for improving the light utilization is achieved. The brightness enhancement element useful in the present invention is preferably a light concentrating film or a multi-layered reflective polarized light recycling film, and more preferably a light concentrating film.

The light concentrating film used in the present invention comprises a substrate and an optical structure layer located on the substrate. The species of the above-mentioned substrate can be any material known to persons having ordinary skill in the art, such as glass or plastic. The above-mentioned plastic substrate can be composed of one or more polymer resin layers. The resin used to form the polymer resin layer(s) is not particularly limited, and can be, for example, but is not limited to: a polyester resin, such as polyethylene terephthalate (PET) and polyethylene naphthalate (PEN); a polyacrylate resin, such as polymethyl methacrylate (PMMA); a polyolefin resin, such as polyethylene (PE) and polypropylene (PP); a polycycloolefin resin; a polyimide resin; a polycarbonate resin; a polyurethane resin; triacetate cellulose (TAC); a polylactic acid (PLA) resin; or a combination thereof. Preferably, the resin is selected from a polyester resin, a polycarbonate resin and a combination thereof, and more preferably, the resin is polyethylene terephthalate. In general, the thickness of the substrate is in the range from about 15 µm to about 300 µm, usually depending on the desired purpose of an optical product.

Generally speaking, the higher the refractive index of the light concentrating film is, the better the light concentrating effect and the brightness enhancement effect are. The refractive index of the light concentrating film used in the present invention is not particularly limited and is usually in the range from about 1.49 to about 1.65. The light concentrating film of the present invention includes a plurality of microstructures having light concentrating effect. The microstructures are not particularly limited and are known to persons having ordinary skill in the art, which can be, for example, but are not limited to columnar structures, conical columnar structures, solid angle structures, orange-segment like structures, lens-like structures, or capsule-like structures, or a combination thereof, of which columnar structures are preferred. The columnar structures can be linear, serpentine or zigzag and any two adjacent columnar structures can be parallel or non-parallel. The height of the peak of a columnar structure may change along the extension direction of the columnar structure or not. The height of the peak of a columnar structure changing along the extension direction of the columnar structure means that at least a portion of the columnar structure changes in height randomly or regularly along the principal axis of the structure. The magnitude of variation in height is at least 3% of the nominal height (or an average height), preferably from 5% to 50% of the nominal height of the structure.

The columnar structures used in the present invention can be the same or different in height and width. The columnar structures can be single-peak columnar structures, multi-peak columnar structures or a combination thereof. Preferably, the single-peak or multi-peak columnar structures are symmetrical columnar structures so as to simplify the processing procedures and control of light concentrating effect more easily.

The columnar structures used in the present invention can be prism columnar structures, arc columnar structures or a combination thereof, of which prism columnar structures are preferred. When the columnar structures are arc columnar structures, the curvature radius of the highest point of the curved surface on the top of each arc columnar structure is in the range from about 2 µm to about 50 µm, preferably in the range from about 3 µm to about 35 µm, and more preferably in the range from about 5 µm to about 12 µm so as to possess both scratch resistance and high brightness. The apex angles of the prism columnar structures or the arc columnar structures used in the present invention can be the same or different. The apex angles of the prism columnar structures are in the range from about 40° to about 120°, and preferably from about 80° and about 120° and the apex angles of the arc columnar structures are in the range from about 40° to about 120°, preferably in the range from about 60° to about 110°.

In order to reduce optical interference, the optical structure layer of the light concentrating film of the present invention preferably includes at least two columnar structures which are not parallel to each other. According to the present invention, the optical structure layer includes at least a set of two non-parallel, crossed columnar structures and/or at least a set of two non-parallel, non-crossed columnar structures.

The optical structure layer according to the present invention can be formed by any method known to persons having ordinary skill in the art, for example, can be formed as a whole together with the substrate (for example, by an embossing process or an injection process). Alternatively, the optical structure layer can be formed in a roll-to-roll continuous process by applying a resin solution on the substrate and curing the resin to form the optical structure layer having a plurality of microstructures for providing light concentrating effect. The thickness of the optical structure layer is not particularly limited and is generally in the range from about 1 µm to about 50 µm, preferably in the range from about 5 µm to about 35 µm, and more preferably in the range from about 15 µm to about 25 µm.

According to one preferred embodiment of the present invention, the optical structure layer is formed in a roll-to-roll continuous process by coating a resin solution on one side of the substrate, carving the coated layer with a roller, and curing the resin so as to form the optical structure layer having a plurality of microstructures for providing light concentrating effect. The resin solution is not particularly limited and can be any resin solution known to persons having ordinary skill in the art, for example, but is not limited to, a UV-curable resin solution. The species of the UV-curable resin is known to persons having ordinary skill in the art, for example, but is not limited to, an acrylate resin, a methacrylate resin, a urethane acrylate resin, or an epoxy acrylate resin.

The light diffusion element useful in the present invention is a high-diffusive diffusion film, which has a haze of no less than 98% as measured according to JIS K7136 standard method, and preferably a total light transmittance of no lower than 60% as measured according to JIS K7136 standard method. The light diffusion element of the present invention includes a substrate having a light diffusion layer on at least one side thereof. In order to obtain a high haze, the substrate may optionally include a light diffusion layer at both sides thereof. The type of the substrate is as described previously, and the substrate is preferably a transparent substrate. The light diffusion element has an overall thickness in a range of about 50 µm to about 400 µm, and preferably in a range of about 200 µm to about 300 µm. The light diffusion element of the present invention has an optical property of high diffusion, such that when the light passes through the light diffusion element, the light source may be scattered and diffused approximately perfectly into a plane light source, so as to eliminate the occurrence of lamp mura.

Figure 1B:
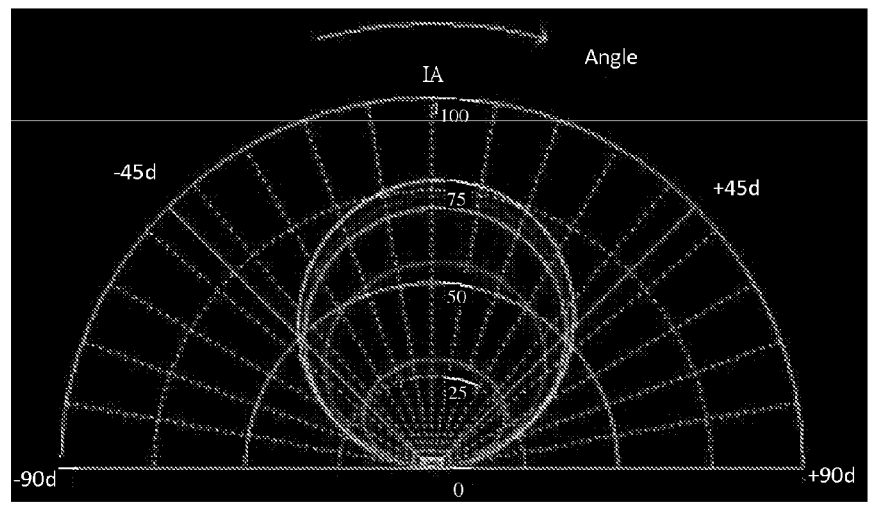

On the other hand, the light diffusion element of the present invention has the efficacy similar to Lambertian diffusion, and thus having the optical property of high uniformization. The light diffusion element of the present invention is detected with a goniophotometer to have an angle with the strongest intensity of emitted light within ±10° when being projected at an incident angle of −90° to 90° (as shown in FIGS. 1a and 1b). Therefore, the light diffusion element of the present invention may guide most of the light incident at various angles into light in a direction perpendicular to the light diffusion element to emit. That is to say, no matter at what an angle the light is incident, the angle with the strongest intensity of emitted light may be controlled to be within ±10° by the light diffusion element of the present invention, and thus the light diffusion element of the present invention has light uniformization efficacy and is capable of easily eliminating the lamp mura.

According to a specific implementation aspect of the present invention, the light diffusion element includes a substrate having a light diffusion layer on one side thereof (for example, a light incident surface or a light emitting surface). According to another specific implementation aspect of the present invention, the light diffusion element includes a substrate having a light diffusion layer on both sides thereof (for example, a light incident surface and a light emitting surface).

The light diffusion layer of the present invention is fabricated by forming a concave-convex microstructure layer on the light incident surface, the light emitting surface, or both surfaces of the substrate. A method for forming the concave-convex microstructure layer is not particularly limited and is well known to those skilled in the art, including, for example, but not limited to, screen printing, spraying, or embossing. It is preferred to coat a resin coating having a concave-convex microstructure on the surface of the substrate.

The resin coating having a concave-convex microstructure contains particles and a binder. In order to achieve high diffusion effect, the diameter of the particles is suitably in a range of about 1 µm to about 20 µm, and preferably in a range of about 1.5 µm to about 10 µm. When the diameter of the particle is lower than 1 µm, it is difficult to generate the diffusion effect, and when the diameter is higher than 20 µm, coating defects are easily generated. Additionally, the content of the particles in the resin coating is preferably about 200 wt % to about 600 wt %, based on the total weight of the solid component of the binder. If the content of the particles is lower than 200 wt %, based on the weight of the binder, the light diffusibility is insufficient; however, if the content of the particles is higher than 600 wt %, the particle is difficult to be fixed in the coating and may easily fall off from the coating. Therefore, in order to obtain a high diffusibility and high stability of the coating, the content of the particles is preferably about 280 wt % to about 400 wt %, and particularly preferably about 305 wt % to about 350 wt %, based on the weight of the binder.

The thickness of the resin coating having the concave-convex microstructure will impact the hazing effect of the light diffusion element. Therefore, the thickness of the resin coating is dependent on the desired haze requirement of the light diffusion element, and is generally in a range of about 5 µm to about 20 µm, preferably in a range of about 10 µm to about 15 µm, and more preferably in a range of about 8 µm to about 13 µm. When the thickness of the coating is lower than 5 µm, the hazing effect is not good; and when the thickness of the coating is higher than 20 µm, the adhesion of the coating decreases, which is not of benefit to the coating. Furthermore, the lamination amount of the resin coating on the substrate may be calculated by subtracting the weight of the substrate per unit area before coating from the total weight of the substrate coated with the resin coating on a single side. According to the present invention, the lamination amount of the resin coating having the concave-convex microstructure is in a range of about 6.5 g/m$^2$ to about 26 g/m$^2$, and preferably in a range of about 10.5 g/m$^2$ to about 19.5 g/m$^2$.

The type of the particles useful in the present invention is not particularly limited, and may be organic particles, inorganic particles, or a mixture thereof. The shape of the used particles is not particularly limited, and may be, for example, a spherical shape or a diamond shape.

The organic particle useful in the present invention is selected from the group consisting of acrylic resin, styrene resin, urethane resin, silicone resin, and a mixture thereof.

The inorganic particle useful in the present invention is selected from the group consisting of zinc oxide, titania, zirconia, alumina, silica, bismuth oxide, zinc sulphide, barium sulphate, and a mixture thereof.

The binder useful in the present invention is not particularly limited, and may be selected from the group consisting of acrylic resin, polyamide resin, epoxy resin, fluorocarbon resin, polyimide resin, polyurethane resin, alkyd resin, polyester resin, and a mixture thereof, with acrylic resin, polyurethane resin, polyester resin, or a mixture thereof being preferred, and acrylic resin being more preferred. The binder useful in the present invention is preferably colorless and transparent, to allow light to pass through.

In order to avoid color difference of the display caused by yellowing of the light diffusion element, an inorganic substance capable of absorbing UV light is optionally added into the resin coating. The type of the inorganic substance useful in the resin coating is not particularly limited, and include, for example, but is not limited to, zinc oxide, lead oxide, alumina, silica, titania, calcium sulfate, barium sulphate, calcium carbonate, or a mixture thereof. The particle size of the inorganic substance is generally 1 to 500 nm, preferably about 1 to about 100 nm, and more preferably about 20 to about 50 nm.

Furthermore, the resin coating useful in the present invention may optionally contains any additive known to those of ordinary skill in the art of the present invention, including, for example, but not limited to, an initiator, a solvent, an antistatic agent, a hardening agent, a modifier, a leveling agent, a stabilizer, a fluorescent whitening agent, or a UV absorber.

According to a preferred embodiment of the present invention, the optical film composite of the present invention includes a light diffusion element and a brightness enhancement element in sequence from the light incident surface. The light diffusion element includes a substrate with a light diffusion layer on both sides thereof, and the light diffusion layer is a resin coating having a concave-convex microstructure. The resin coating contains particles and a binder, and the content of the particles is in a range of about 280 to about 400 wt % based on the weight of the binder. The light diffusion element has a haze of no less than 98% and preferably no less than 99% as measured according to JIS K7136 standard method. The brightness enhancement element is a light concentrating film, and the light concentrating film includes a substrate and an optical structure layer located on the substrate. The optical structure layer includes a plurality of arc columnar structures, and the radius of curvature at the highest point of the top curved surface of the arc columnar structures is in a range of 5 μm to 12 μm, and the optical structure layer may optionally includes at least two arc columnar structures not parallel to each other. The particles are preferably organic particles in a range of about 1.5 μm to about 10 μm, and the organic particles are preferably silicone resin particles.

In order to achieve ease of use, the optical film composite of the present invention may optionally includes an intermediate member. The intermediate member is located between the brightness enhancement element and the light diffusion element, and has a thickness in a range of about 0.5 μm to about 250 μm, preferably in a range of about 1 μm to about 100 μm, and particularly preferably in a range of about 1 μm to about 50 μm. The intermediate member of the present invention may be used to link or support the light condensing element and the light diffusion element, and fix the two elements with respect to each other, to enhance the positioning effect. Furthermore, the intermediate member may provide a buffer area for releasing the stress generated when the optical film composite deforms or is subjected to an external force, so as to effectively eliminate the waving phenomenon caused by the factors, such as, non-uniformly heating, humidity, or gravity of materials, of the brightness enhancement element and/or the light diffusion element.

According to a preferred embodiment of the present invention, the intermediate member of the present invention is an adhesion layer, and the adhesion layer is formed from a transparent optical adhesive. The method for preparing the intermediate member is not particularly limited, and includes, for example, but is not limited to, applying the optical adhesive onto one side of the brightness enhancement element or the light diffusion element through coating or screen printing, to adhere the brightness enhancement element with the light diffusion element.

The optical adhesive useful in the present invention has a transmittance of higher than 90% and a refractive index in a range of about 1.4 to about 1.6. The optical adhesive useful in the present invention is a thermal curing resin or a UV curing resin, or a mixture thereof, and the type of the optical adhesive is not particularly limited, and may be, for example, selected from the group consisting of silicone resin, acrylic resin, polyester resin, polyether resin, polyurethane (PU) resin, epoxy resin, and a mixture thereof.

According to a preferred embodiment used in the present invention, the optical adhesive used in the present invention is a pressure-sensitive adhesive (PSA), which is capable of achieving a good adhesion effect in a short period of time by applying a slight pressure, and is applicable in a roll to roll continuous production technology. The optical adhesive capable of serving as a PSA is not particularly limited, and the commercially available products include, for example, AO-802 or AO-805 manufactured by Eternal Company, 8171, 8141, 8142, or 8212 manufactured by 3M Company, or CS9621 manufactured by Nitto Denko Company.

The optical film composite of the present invention is illustrated below in detail by preferred embodiments with reference to the drawings, which are not intended to limit the scope of the present invention. Any modifications or alterations that can be easily accomplished by those having ordinary skill in the art fall within the scope of the disclosure of the specification.

Figure 2:
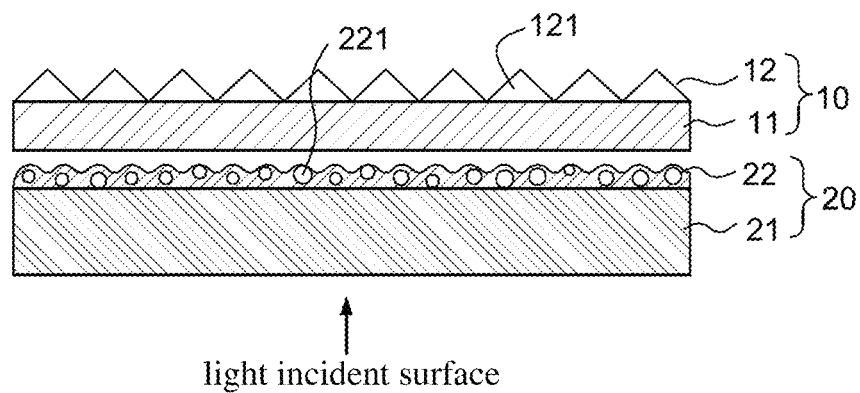
FIGS. 2 to 20 are schematic views of different embodiments of the optical film composites according to the present invention.

FIG. 2 shows an optical film composite according to one embodiment of the present invention. As shown in FIG. 2, the optical film composite of the present invention includes a light concentrating film 10 and a light diffusion element 20, wherein light concentrating film 10 comprises a substrate 11 and an optical structure layer 12 located on the substrate 11. The optical structure layer comprises a plurality of prism columnar structures 121. The light diffusion element 20 comprises a substrate 21 and a convex-concave microstructure layer 22 located on the light emitting surface of the substrate 21 wherein the convex-concave microstructure layer 22 comprises particles 221. In this embodiment, the light diffusion element 20 is on the light incident side of the optical film composite of the present invention.

Figure 3:
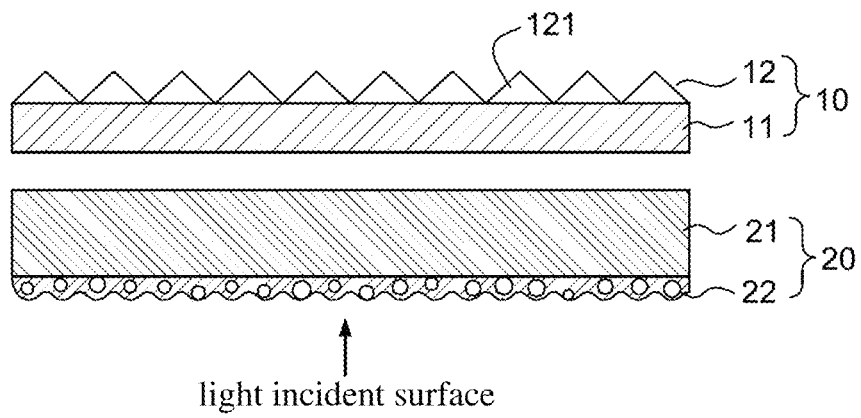

FIG. 3 shows an optical film composite according to another embodiment of the present invention. In this embodiment, except that the convex-concave microstructure layer 22 is located on the light incident surface of the substrate 21, the structure and construction of the optical film composite are same as those illustrated in FIG. 2.

Figure 4:
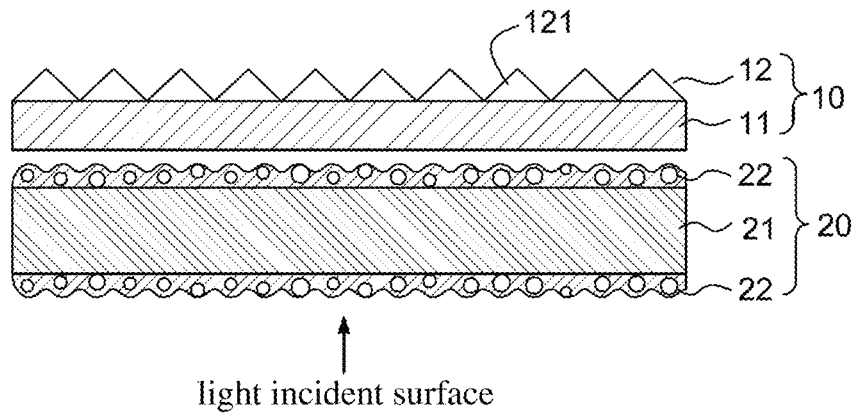

FIG. 4 shows an optical film composite according to a further embodiment of the present invention. In this embodiment, the light diffusion element 20 comprises a substrate 21, and except that the light incident surface and the light emitting surface of the substrate 21 both comprise a convex-concave microstructure layer 22, the structure and construction of the optical film composite are same as those illustrated in FIG. 2.

Figure 5:
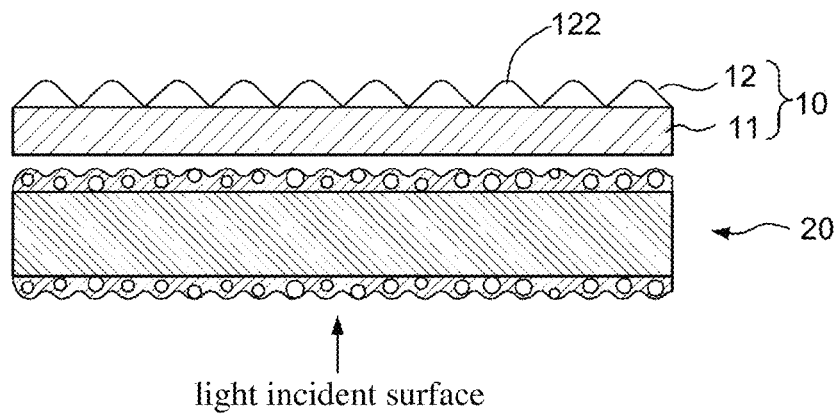

FIG. 5 shows an optical film composite according to a further embodiment of the present invention. Except that arc columnar structures 122 are used in place of prism columnar structures 121, the structure and construction of the optical film composite illustrated in FIG. 5 are same as those illustrated in FIG. 4.

Figure 6A:
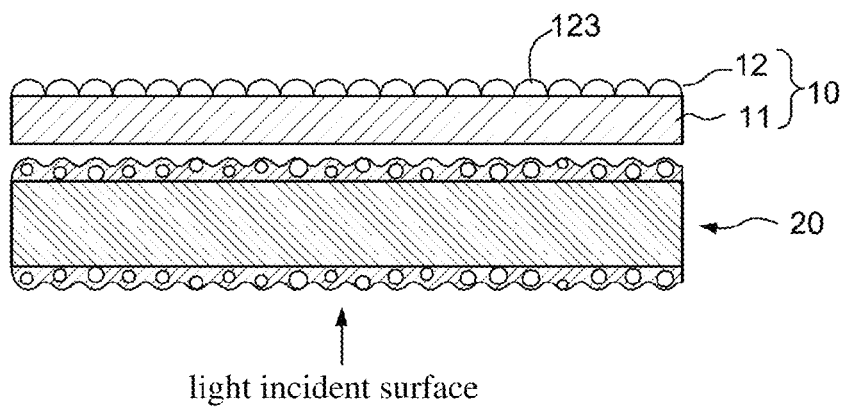
Figure 6B:
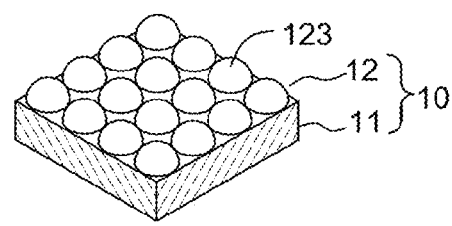

FIG. 6(a) shows an optical film composite according to a further embodiment of the present invention. Except that lens-like structures 123 are used in place of prism columnar structures 121, the structure and construction of the optical film composite illustrated in FIG. 6(a) are same as those illustrated in FIG. 4. FIG. 6(b) is a stereographic view of the light concentrating film of the optical film composite of FIG. 6(a).

Figure 7:
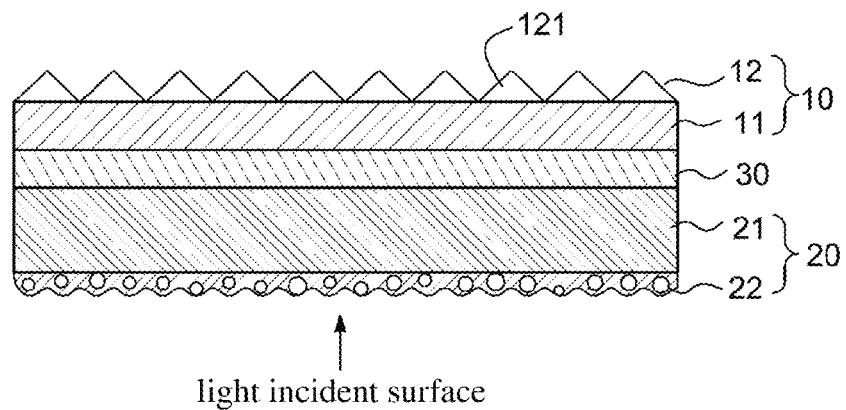

FIG. 7 shows an optical film composite according to a further embodiment of the present invention. Except that an intermediate member 30 is located between the light concentrating film 10 and the light diffusion element 20 as an adhesion layer, the structure and construction of the optical film composite illustrated in FIG. 7 are same as those illustrated in FIG. 3.

Figure 8:
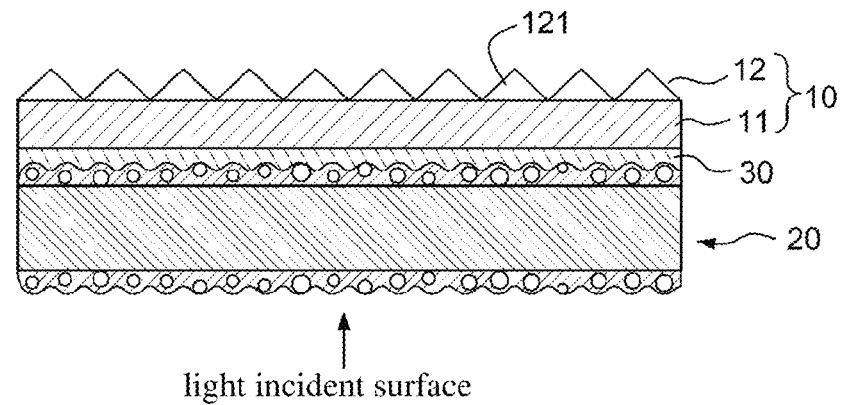

FIG. 8 shows an optical film composite according to a further embodiment of the present invention. Except that an intermediate member 30 is located between the light concentrating film 10 and the light diffusion element 20 as an adhesion layer, the structure and construction of the optical film composite illustrated in FIG. 8 are same as those illustrated in FIG. 4.

Figure 9:
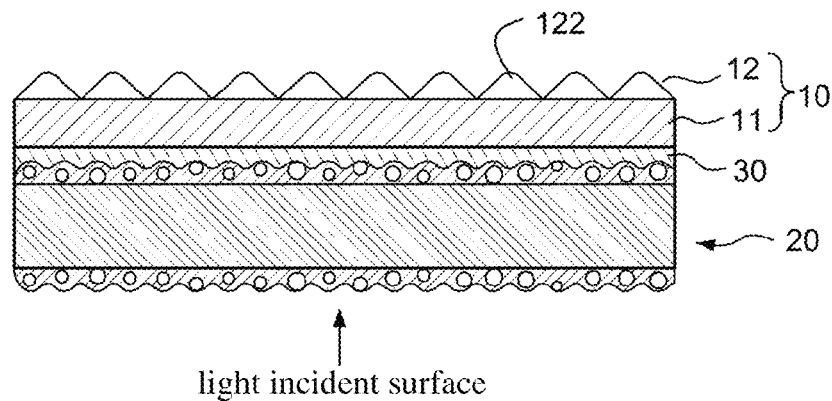

FIG. 9 shows an optical film composite according to a further embodiment of the present invention. Except that an intermediate member 30 is located between the light concentrating film 10 and the light diffusion element 20 as an adhesion layer, the structure and construction of the optical film composite illustrated in FIG. 9 are same as those illustrated in FIG. 5.

Figure 10:
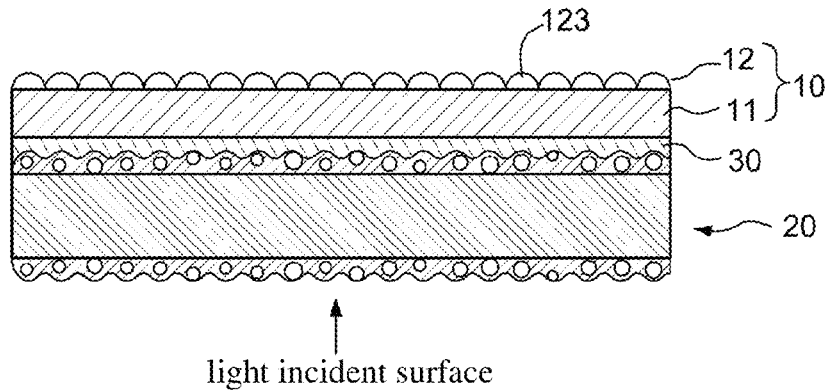

FIG. 10 shows an optical film composite according to a further embodiment of the present invention. Except that an intermediate member 30 is located between the light concentrating film 10 and the light diffusion element 20 as an adhesion layer, the structure and construction of the optical film composite illustrated in FIG. 10 are same as those illustrated in FIG. 6(a). In addition, FIG. 6(b) can be referred to for the stereographic view of the light concentrating film 10.

Figure 11:
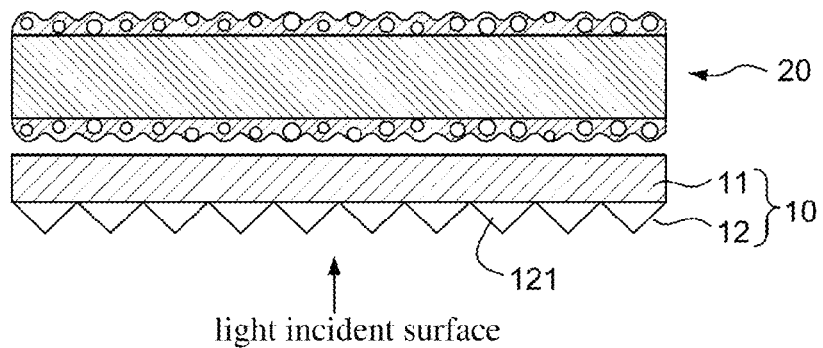

FIG. 11 shows an optical film composite according to a further embodiment of the present invention. The optical film composite of FIG. 11 includes a light concentrating film 10 and a light diffusion element 20, wherein the light concentrating film 10 comprises a substrate 11 and an optical structure layer 12 located on the substrate 11. The optical structure layer comprises a plurality of prism columnar structures 121. The structure of the light diffusion element 20 is same as that illustrated in FIG. 4. In this embodiment, the light concentrating film 10 is on the light incident side of the optical film composite of the present invention and the optical structure layer faces the light source.

Figure 12:
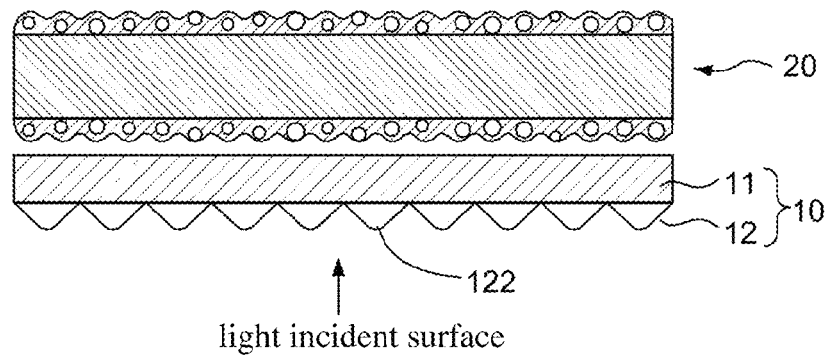

FIG. 12 shows an optical film composite according to a further embodiment of the present invention. Except that arc columnar structures 122 are used in place of prism columnar structures 121, the structure and construction of the optical film composite illustrated in FIG. 12 are same as those illustrated in FIG. 11.

Figure 13:
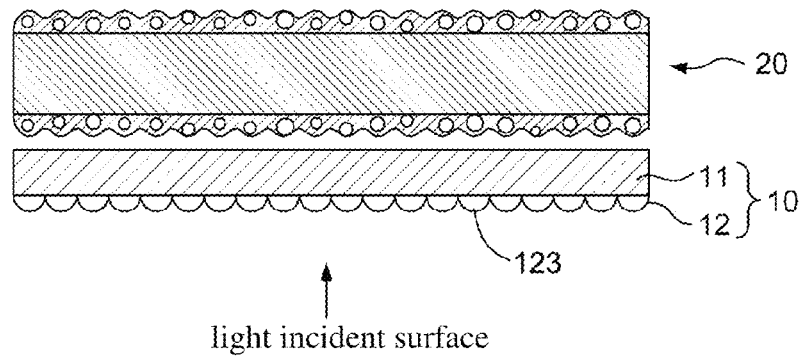

FIG. 13 shows an optical film composite according to a further embodiment of the present invention. Except that lens-like structures 123 are used in place of prism columnar structures 121, the structure and construction of the optical film composite illustrated in FIG. 13 are same as those illustrated in FIG. 11. In addition, FIG. 6(b) can be referred to for the stereographic view of the light concentrating film 10.

Figure 14:
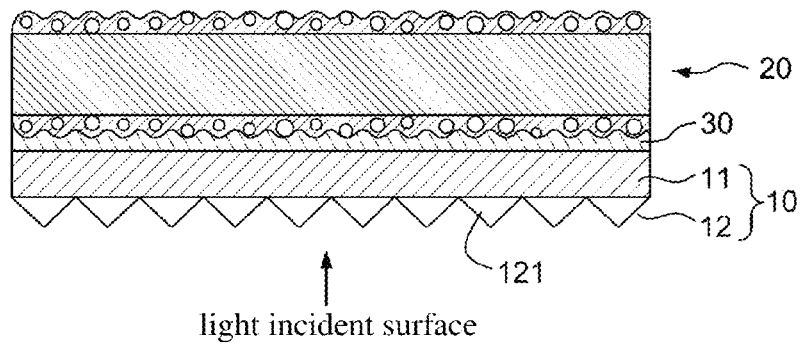

FIG. 14 shows an optical film composite according to a further embodiment of the present invention. Except that an intermediate member 30 is located between the light concentrating film 10 and the light diffusion element 20 as an adhesion layer, the structure and construction of the optical film composite illustrated in FIG. 14 are same as those illustrated in FIG. 11.

Figure 15:
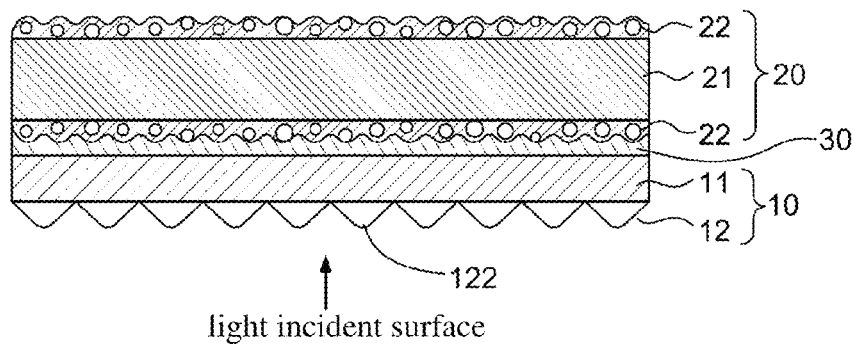

FIG. 15 shows an optical film composite according to a further embodiment of the present invention. Except that an intermediate member 30 is located between the light concentrating film 10 and the light diffusion element 20 as an adhesion layer, the structure and construction of the optical film composite illustrated in FIG. 15 are same as those illustrated in FIG. 12.

Figure 16:
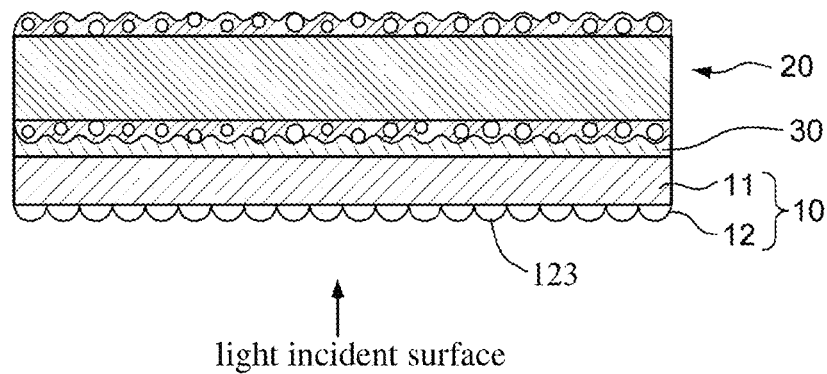

FIG. 16 shows an optical film composite according to a further embodiment of the present invention. Except that an intermediate member 30 is located between the light concentrating film 10 and the light diffusion element 20 as an adhesion layer, the structure and construction of the optical film composite illustrated in FIG. 16 are same as those illustrated in FIG. 13.

Figure 17:
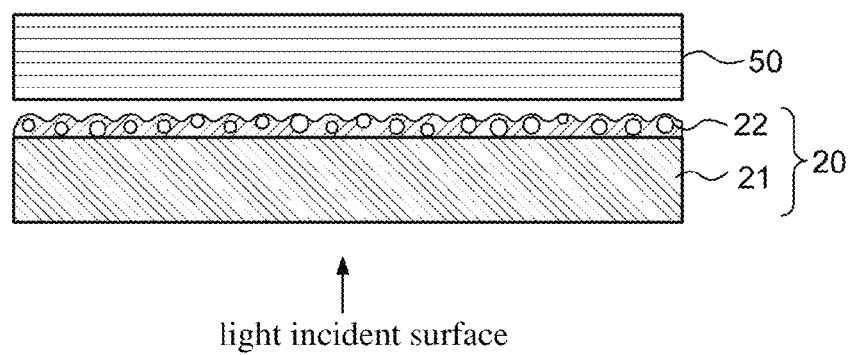

FIG. 17 shows an optical film composite according to a further embodiment of the present invention. The optical film composite of FIG. 17 includes a multi-layered reflective polarized light recycling film 50 and a light diffusion element 20. The light diffusion element 20 comprises a substrate 21 and a convex-concave microstructure layer 22 located on the light emitting surface of the substrate 21. In this embodiment, the light diffusion element 20 is on the light incident side of the optical film composite of the present invention.

Figure 18:
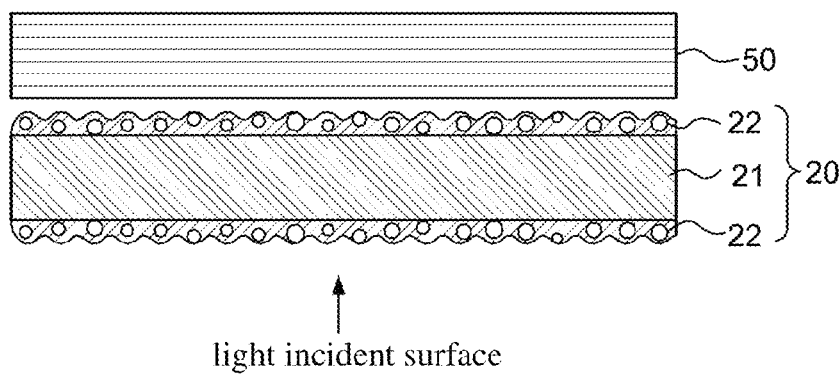

FIG. 18 shows an optical film composite according to a further embodiment of the present invention. The optical film composite of FIG. 18 includes a multi-layered reflective polarized light recycling film 50 and a light diffusion element 20. The light diffusion element 20 comprises a substrate 21 and the light emitting surface and the light incident surface of the substrate 21 both comprise a convex-concave microstructure layer 22. In this embodiment, the light diffusion element 20 is on the light incident side of the optical film composite of the present invention.

Figure 19:
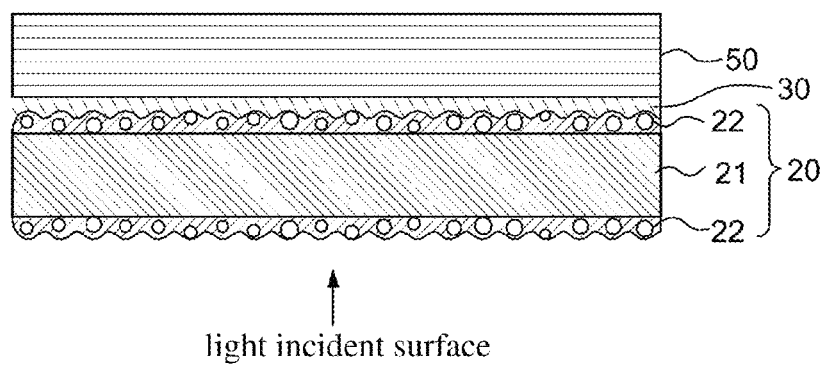

FIG. 19 shows an optical film composite according to a further embodiment of the present invention. Except that an intermediate member 30 is located between the multi-layered reflective polarized light recycling film 50 and the light diffusion element 20 as an adhesion layer, the structure and construction of the optical film composite illustrated in FIG. 19 are same as those illustrated in FIG. 18.

Figure 20:
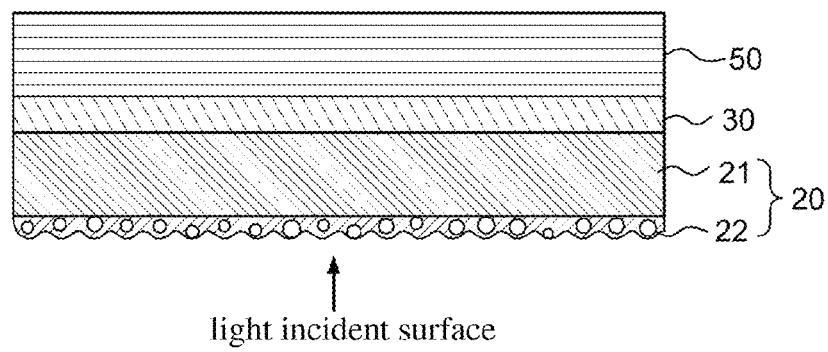

FIG. 20 shows an optical film composite according to a further embodiment of the present invention. Except that a multi-layered reflective polarized light recycling film 50 is used in place of the light concentrating film 10, the structure and construction of the optical film composite illustrated in FIG. 20 are same as those illustrated in FIG. 7.

The LEDs are point light source, have high directionality and have different light and dark phenomena in the perpendicular direction and in the parallel direction. Therefore, to efficiently eliminate the mura in a LED back light module, not only the luminance uniformity value in the perpendicular direction and that in the parallel direction should be adjusted, but the difference thereof should be controlled and cannot be too large (i.e., it is necessary to adjust the overall luminance uniformity). The optical film composite according to the present invention comprises a brightness enhancement element and a light diffusion element, which utilizes a high-diffusive light diffusion element having a haze of no less than 98% to diffuse the light and then utilizes a brightness enhancement element to reflect a portion of the light back to the back light module. The reflected light passes through the light diffusion element for re-diffusing. Finally, the light can be uniformized overall. Furthermore, the brightness enhancement element has a brightness enhancement effect so that the optical film composite according to the present invention can not only uniformize the light but also maintain good luminance. Given the above, the optical film composite according to the present invention can effectively improve the mura without providing any additional light mixing distance, and hence, it is suitable for a direct type back light module, particularly a direct type LED back light module, and meet the demand for lighter and thinner displays in the field and save the cost of the whole direct type back light module.

The following embodiments will provide further descriptions for the optical element of the present invention and the preparation method thereof.

EXAMPLES

Anti-Mura Test

The direct type LED back light module includes a plurality of LED light sources located directly below the back light module. The light source provided by the direct type LED back light module is a point light source, and if the optical element used in combination does not have enough light uniformization effect, visually visible non-uniform brightness will be generated, which is called as mura, and seriously impacts the image quality.

In conventional technologies, there is no method for quantifying mura, and mura is only determined with naked eyes, and thus the mura phenomenon cannot be specifically evaluated. The present invention provides a method for quantifying the uniformity of the light of the LED back light module, so as to evaluate the elimination degree of mura with a luminance uniformity value.

The method of the present invention is as follows:

I. Evaluation of the Longitudinal Luminance Uniformity of the Back Light Module

1. A central longitudinal axis of the back light module is taken, and luminance values (L) of a plurality of test points on the axis are measured.

2. The luminance value (L) of each point on the central longitudinal axis is plotted against the position of the point, and the luminance value is in a wavy distribution with respect to the position of the point.

3. After excluding the data with large difference of the two end points of the central longitudinal axis, the maximal luminance value ($L_{Vmax}$) and the minimal luminance value ($L_{Vmin}$) in the same wave obtained on the central longitudinal axis are taken.

4. The luminance uniformity value $R_V$ of the central longitudinal axis is calculated according to a formula below:

$$R_V = L_{Vmin}/L_{Vmax}.$$

The closer to 1 $R_V$ is, the higher the longitudinal luminance uniformity of the back light module is, and thus the more unobvious the mura phenomenon in the longitudinal direction is. Generally speaking, when $R_V$ is higher than 0.983, it is indicated that the longitudinal luminance of the back light module approaches uniformity, and the mura phenomenon in the longitudinal direction will not be easily observed with naked eyes.

II. Evaluation of Horizontal Luminance Uniformity of the Back Light Module

1. A central horizontal axis of the back light module is taken, and luminance values (L) of a plurality of test points on the axis are measured.

2. The luminance value (L) of each point on the central horizontal axis is plotted against the position of the point, and the luminance value is in a wavy distribution with respect to the position of the point.

3. After excluding the data with large difference of the two end points of the central horizontal axis, the maximal luminance value ($L_{Hmax}$) and the minimal luminance value ($L_{Hmin}$) in the same wave obtained on the central horizontal axis are taken.

4. The luminance uniformity value $R_H$ of the central horizontal axis is calculated according to a formula below:

$$R_H = L_{Hmin}/L_{Hmax}.$$

The closer to 1 $R_H$ is, the higher the horizontal luminance uniformity of the back light module is, and thus the more unobvious the mura phenomenon in the horizontal direction is. Generally speaking, when $R_H$ is higher than 0.983, it is indicated that the horizontal luminance of the back light module approaches uniformity, and the mura phenomenon in the horizontal direction will not be easily observed with naked eyes.

III. When the values of $R_V$ and $R_H$ are both higher than 0.983, although the mura phenomenon in the longitudinal direction and the horizontal direction is unobvious according to the evaluation of Steps I and II, if the difference between $R_V$ and $R_H$ is excessively large, the visual effect is not good, and the mura phenomenon occurred on the back light module is still observed. Therefore, when the values of $R_V$ and $R_H$ are both higher than 0.983, the overall luminance uniformity of the back light module is evaluated according to a formula below:

$$M.I. \text{ (mura index)} = |(R_H/R_V) - 1|.$$

The closer to 0 M.I. is, the smaller the difference between the luminance values of the horizontal axis and the horizontal axis is. Generally speaking, when the M.I. is higher than 0.002, the mura phenomenon will be observed with naked eyes.

Preparation of Film Sheet

Brightness Enhancement Element 1

Commercially available optical element: Gamma Company, model HGP210 (a light concentrating film having a prism columnar structure).

Brightness Enhancement Element 2

Commercially available optical element: LG Chemical Company, model LSF-451B (a light concentrating film having an arc columnar structure).

Brightness Enhancement Element 3

Commercially available optical element: SHINWHA Company, model PTR-763 (a light concentrating film having a lens-shaped structure).

Brightness Enhancement Element 4

Commercially available optical element: 3M Company, model DBEF-D2-280 (a multi-layered reflective polarized light recycling film).

Light Diffusion Element 1

24.0 g acrylic resin [Eterac 7363-ts-50, Eternal Company] (having a solid content of about 50%) was added into a plastic bottle, and then 33 g butyl acetate and 24 g propylene glycol methyl ether acetate as solvent, 40 g silicone resin bead with an average particle size of 2 μm [Tospearl 120E, GE Toshiba Silicones Company], and 56 g mixed solution of nano titania and zinc oxide (in which the solid content was about 50%, and the weight ratio of titania to zinc oxide was 80:20) were added in sequence with high-speed stirring. Finally, 2.4 g curing agent [Desmodur 3390, Bayer Corporation] (having a solid content of about 75%) was added, and formulated into a coating with a solid content of about 44% and a total weight of about 179.4 g.

The coating was coated on surfaces at both sides of a PET substrate [O330E250, Mitsubishi Company] respectively, dried at 120° C. for 1 min, to obtain 10 μm coating films (with a lamination amount of 13 g/m$^2$). The resulting light diffusion element has a haze of 99.15% as measured according to JIS K7136 standard method.

Light Diffusion Element 2

The preparation was the same as that of the light diffusion element 1, except that the coating was coated only on a surface at one side of the substrate. The resulting light diffusion element has a haze of 98% as measured according to JIS K7136 standard method.

An automatic goniophotometer [GP-200, from Murakami color research laboratory] was used to measure the light emitted at various angles from the light diffusion element 2. The results are as shown in FIGS. 1a and 1b. As shown in FIGS. 1a and 1b, the angle with the strongest intensity of the emitted light of the light diffusion element 2 is within ±10°. Therefore, most of the light incident at various angles is guided into light in a direction perpendicular to the light diffusion element to emit.

Light Diffusion Element 3

Commercially available optical element: Eternal Chemical Company, model Etertec DI500C, having a haze of 94% as measured according to JIS K7136 standard method.

Light Diffusion Element 4

Commercially available optical element: Eternal Chemical Company, model Etertec DI700C, having a haze of 96% as measured according to JIS K7136 standard method.

Preparation of Optical Adhesive

Optical Adhesive 1

Eternal Chemical Company, model AO-802, having a refractive index of 1.5 as measured with AUTOMATIC REFRACTOMETER GPR 11-37® instrument from Index Instruments Inc.

Preparation of Back Light Module

A lamp box of 20 cm×20 cm for a direct type LED back light module was prepared. The lamp box has a thickness of 24 mm, and has a supporting steel plate at the bottom thereof. The steel plate has a reflective sheet attached thereon, 64 LED lamps are uniformly disposed and fixed above the reflective sheet, and a supporting diffusion plate is disposed above the LED lamps.

The optical films or optical film composites of the following Examples/Comparative Examples were disposed above the diffusion plate, and $R_V$ and $R_H$ were calculated according to the methods described above, to evaluate the longitudinal and horizontal luminance uniformity of the back light module, and then samples with $R_V$ and $R_H$ higher than 0.983 were taken to calculate the M.I. value, to evaluate the overall luminance uniformity.

Example 1 (E1)

The brightness enhancement element 1 was disposed above the light diffusion element 1, with the optical structure layer of the brightness enhancement element 1 facing a direction opposite to the lamps.

Example 2 (E2)

The brightness enhancement element 2 was disposed above the light diffusion element 1, with the optical structure layer of the brightness enhancement element 2 facing the direction opposite to the lamps.

Example 3 (E3)

The brightness enhancement element 3 was disposed above the light diffusion element 1, with the optical structure layer of the brightness enhancement element 3 facing the direction opposite to the lamps.

Example 4 (E4)

The brightness enhancement element 4 was disposed above the light diffusion element 1.

Comparative Example 1 (C1)

Blank experiment: no film sheet was disposed.

Comparative Example 2 (C2)

Only the light diffusion element 1 was disposed.

Comparative Example 3 (C3)

The brightness enhancement element 1 was disposed above the light diffusion element 3, with the optical structure layer of the brightness enhancement element 1 facing the direction opposite to the lamps.

Comparative Example 4 (C4)

The brightness enhancement element 1 was disposed above the light diffusion element 4, with the optical structure layer of the brightness enhancement element 1 facing the direction opposite to the lamps.

TABLE 1

| Comparative Example/Example | $R_V$ | $R_H$ | M.I |
|---|---|---|---|
| E1 | 0.9939 | 0.9931 | 0.0008 |
| E2 | 0.9911 | 0.9902 | 0.0009 |
| E3 | 0.9870 | 0.9866 | 0.0004 |
| E4 | 0.9874 | 0.986 | 0.0014 |
| C1 | 0.9729 | 0.9793 | — |
| C2 | 0.9844 | 0.9899 | 0.0056 |
| C3 | 0.9767 | 0.9805 | — |
| C4 | 0.9840 | 0.9811 | — |

It can be seen from the results of Examples 1 to 4 that, the optical film composite of the present invention includes a light diffusion element having a haze of no less than 98% and a brightness enhancement element, the luminance uniformity value $R_V$ of the central longitudinal axis and the luminance uniformity value $R_H$ of the central horizontal axis are both higher than 0.983, and M.I. is lower than 0.002. Therefore, the overall luminance uniformity of the back light module is good, and no mura phenomenon occurs.

In Comparative Example 1, no film sheet is disposed, and in Comparative Examples 3 and 4, light diffusion elements having a haze of less than 98% are used. In Comparative Examples 1, 3, and 4, the resulting $R_H$ and/or $R_V$ values are all lower than 0.983, and thus the mura phenomenon cannot be effectively eliminated.

In Comparative Example 2, the resulting $R_H$ and $R_V$ values are higher than 0.983, but as M.I. is higher than 0.002 and the difference between $R_H$ and $R_V$ is large, the mura phenomenon still occurs.

Anti-Scratch & Abrasion Resistance Test

Generally speaking, when a light concentrating film having an arc columnar structure is used, the larger the radius (R) of curvature at the highest point of the top curved surface of the arc columnar structure is, the better the anti-scratch performance is.

Test Method

Measurement of Radius (R) of Curvature at the Top:

The radius of curvature at the top of the arc columnar structure was measured with a MM400-Lu Metallurgical Microscope RLM615 instrument from NIKON Company. The results are recorded in Table 2.

Anti-Scratch Test:

With a linear abrasion tester [TABER 5750], a light concentrating film (area: 20 mm×20 mm (length×width)) to be tested was adhered on a 350 g weight platform with the optical structure layer facing upwards. The anti-scratch test was performed on the other surface of a film sheet of the same type (a side having no optical structure layer) at a test path of 0.5 inch at a speed of 10 cycle/min for 10 cycles, and the optical structure layer and the other surface of the film sheet of the same type were observed to determine whether they had been scratched. If both not scratched, they both pass the test. The results of the test are shown in Table 2.

Abrasion Resistance Test:

A light concentrating film (length×width: 100 mm×100 mm) to be tested was taken, and abrasion of the optical structure layer was tested according to ASTM D4060 standard method (CS-10 wheel, 1,000 g, 1,000 cycles). If the weight loss is lower than 100 mg, the test is passed.

Example 2-1 (E2-1)

Preparation of Brightness Enhancement Element 5

A commercially available resin (model 6510H®, sold by Eternal Chemical Company) was coated onto a PET substrate (model U34®, manufactured by TORAY Company) to form a coating. Next, a plurality of arc columnar structures was formed on the coating by embossing with a roller. Then the coating was irradiated with a UV energy (350 mJ/cm$^2$) ray and cured, to obtain a microstructure layer. The resulting microstructure layer has a thickness of 30 μm, the radius (R) of curvature at the top of the arc columnar structures is 10 μm, and the width of the arc columnar structures is 60 μm. The brightness enhancement element 5 was disposed above the light diffusion element 1, with the optical structure layer of the brightness enhancement element 5 facing the direction opposite to the light source.

Examples 2-2 to 2-5 (E2-2 to E2-5)

The method of Embodiment 2-1 was repeated, and the radius (R) of curvature at the top of the arc columnar structures was changed to be 5 μm, 3 μm, 2 μm, and 0 μm respectively.

TABLE 2

| Embodiment | R | $R_V$ | $R_H$ | M.I | Anti-scratch Test | Abrasion resistance test |
|---|---|---|---|---|---|---|
| E2-1 | 10 μm | 0.9911 | 0.9902 | 0.0009 | ○ | ○ |
| E2-2 | 5 μm | 0.9916 | 0.9922 | 0.0006 | ○ | ○ |
| E2-3 | 3 μm | 0.9925 | 0.9918 | 0.0007 | X | X |
| E2-4 | 2 μm | 0.9930 | 0.9923 | 0.0006 | X | X |
| E2-5 | 0 μm | 0.9939 | 0.9931 | 0.0008 | X | X |

○: The test is passed.
X: The test is not passed.

It can be seen from the results of Example 2-1 to 2-5 that, when a light concentrating film having a radius of curvature at the highest point of the top curved surface of the arc columnar structure of at least 5 μm is used, the resulting values of $R_H$ and $R_V$ are both higher than 0.983, and M.I. is lower than 0.002, and thus the mura phenomenon can be effectively eliminated, and good anti-scratch performance and abrasion resistance can be obtained at the same time.

Waving Test

The optical film composites of Examples 5 to 8 below were cut to have a size of length×width: 100 mm×100 mm, placed in an oven at 120° C. for 10 min, and then taken out and placed at room temperature, till the temperature of the film sheet was back to room temperature. The degree of waving at four corners of the film sheet was measured with a gap gauge (recorded in mm; and recording manner, for example, 0;0;0; 0), to evaluate the thermal resistance and waving resistance of the samples tested. The results are recorded in Table 3.

Examples 5 to 8 (E5 to E8)

The optical adhesive 1 was used as an intermediate member (having a thickness of 25 μm) to respectively adhere the brightness enhancement elements and the light diffusion elements of the optical film composites of Examples 1 to 4 together. Except the added intermediate member, the resulting optical film composite was disposed in a back light module in the same manner as that in Examples 1 to 4.

TABLE 3

| Example | $R_V$ | $R_H$ | M.I | Waving Test (mm) |
|---|---|---|---|---|
| E5 | 0.9869 | 0.9875 | 0.0006 | 0; 0; 0; 0 |
| E6 | 0.9867 | 0.9861 | 0.0006 | 0; 0; 0; 0 |
| E7 | 0.9866 | 0.9859 | 0.0007 | 0; 0; 0; 0 |
| E8 | 0.9866 | 0.9846 | 0.002 | 0; 0; 0; 0 |

It can be seen from the results of Examples 5 to 8 that, if the optical film composite of the present invention includes an intermediate member between the brightness enhancement element and the light diffusion element, the intermediate member may provide a buffer area for releasing the stress of the optical film composite, so as to avoid the waving phenomenon of the optical film composite. Furthermore, although the optical film composites of Examples 5 to 8 further include an intermediate member, the resulting $R_H$ and $R_V$ values are still both higher than 0.983, and M.I. is lower than 0.002, and thus the mura phenomenon is effectively eliminated.

Example 5-1 (E5-1)

Example 5-1 was the same as Example 5 except that the optical adhesive 1 was used as an intermediate member (having a thickness of 1 μm). The results are recorded in Table 4.

TABLE 4

| Example | $R_V$ | $R_H$ | M.I | Waving Test (mm) |
|---|---|---|---|---|
| E5 | 0.9869 | 0.9875 | 0.0006 | 0; 0; 0; 0 |
| E5-1 | 0.9867 | 0.9861 | 0.0006 | 0; 0; 0; 0 |

It can be seen from the results of Examples 5 and 5-1 that, by combining the brightness enhancement element and the light diffusion element with an optical adhesive, waving phenomenon of the optical film composite will not occur even when the thickness of the optical adhesive is only 1 μm, and the effect of eliminating the mura can be achieved.

Example 9 (E9)

The brightness enhancement element 2 was disposed above the light diffusion element 2, with the concave-convex microstructure layer of the light diffusion element 2 facing the brightness enhancement element 2, and the optical structure layer of the brightness enhancement element 2 facing the direction opposite to the light source.

Example 10 (E10)

The optical adhesive 1 was used as an intermediate member (having a thickness of 25 μm) to adhere a side of the brightness enhancement element 2 which has no optical structure layer and a side of the light diffusion element 2 which is not coated with the resin coating together, with the optical structure layer of the brightness enhancement element 2 facing the direction opposite to the light source.

The luminance uniformity value ($R_V$) of the longitudinal axis, the luminance uniformity value ($R_H$) of the horizontal axis, and the luminance uniformity value (M.I.) of the resulting modules of Examples 9 and 10 were calculated, and the results were shown in Table 5.

TABLE 5

| Embodiment | $R_V$ | $R_H$ | M.I |
|---|---|---|---|
| E9 | 0.9866 | 0.9859 | 0.0007 |
| E10 | 0.9866 | 0.9854 | 0.0012 |

It can be seen from the results of Examples 9 and 10 that the optical film composite of the present invention includes a light diffusion element, and no matter whether one or two light diffusion layers are included in the light diffusion element, the effect of eliminating the mura can be achieved as long as the light diffusion element has a haze of no less than 98%.

Example 1-1 (E1-1)

Preparation of Light Diffusion Element 1-1

The preparation was the same as that of the light diffusion element 1, except that 33.7 g silicone resin bead having an average particle size of 5 μm was used, to formulate a coating with a solid content of about 42.5% and a total weight of about 173 g. The coating was coated on surfaces at both sides of a PET substrate respectively, and the thickness of the coating was 13 μm (with a lamination amount of 11.2 g/m$^2$). The resulting light diffusion element has a haze of 98.7% as measured according to JIS K7136 standard method.

Except that the light diffusion element 1-1 was used, the resulting optical film composite was disposed in a back light module in the same manner as that in Example 1.

Example 1-2 (E1-2)

Preparation of Light Diffusion Element 1-2

The preparation was the same as that of the light diffusion element 1, except that 45.8 g silicone resin bead having an average particle size of 3 μm was used, to formulate a coating with a solid content of about 46% and a total weight of about 185 g. The coating was coated on surfaces at both sides of a PET substrate respectively, and the thickness of the coating was 8 μm (with a lamination amount of 12 g/m$^2$). The resulting light diffusion element has a haze of 99.35% as measured according to JIS K7136 standard method.

Except that the light diffusion element 1-2 was used, the resulting optical film composite was disposed in a back light module in the same manner as that in Example 1.

The luminance uniformity value ($R_V$) of the longitudinal axis, the luminance uniformity value ($R_H$) of the horizontal axis, and the luminance uniformity value (M.I.) of the resulting modules of Examples 1, 1-1, and 1-2 were calculated, the haze was measured. The results were shown in Table 6.

TABLE 6

| Example | Haze | $R_V$ | $R_H$ | M.I |
|---|---|---|---|---|
| E1 | 99.15 | 0.9939 | 0.9931 | 0.0008 |
| E1-1 | 98.7 | 0.9936 | 0.9927 | 0.0009 |
| E1-2 | 99.35 | 0.9941 | 0.9935 | 0.0006 |

It can be seen from the results of Examples 1, 1-1, and 1-2 that, the light diffusion element of the present invention may be adjusted according to the requirements of different products, the effect of eliminating the mura can be achieved, when the light diffusion element has a haze of no less than 98%, and the higher the haze is, the better the effect is.

We claim:

1. An optical film composite, comprising a brightness enhancement element, a light diffusion element and an intermediate member located between the brightness enhancement element and the light diffusion element,
   wherein the light diffusion element comprises a substrate having a light diffusion layer on at least one side thereof and the light diffusion element has a haze of no less than 98% as measured according to JIS K7136 standard method; and
   wherein the intermediate member is an optical adhesive, and the optical adhesive has a transmittance higher than 90% and a refractive index in a range of 1.4 to 1.6; and
   wherein the intermediate member has a thickness in a range of 0.5 μm to 250 μm.

2. The optical film composite according to claim 1, wherein the substrate of the light diffusion element has a light diffusion layer at both sides thereof.

3. The optical film composite according to claim 1, wherein the light diffusion element is detected with a goniophotometer to have an angle with the strongest intensity of emitted light within ±10° when being projected at an incident angle of −90° to 90°.

4. The optical film composite according to claim 1, wherein the light diffusion layer is a resin coating having a concave-convex microstructure, the resin coating contains particles and a binder, and the content of the particles is 200-600 wt %, based on the total weight of the solid component of the binder.

5. The optical film composite according to claim 4, wherein the content of the particles is 280-400 wt %, based on the total weight of the solid component of the binder.

6. The optical film composite according to claim 4, wherein the resin coating has a thickness in a range of 5 μm to 20 μm.

7. The optical film composite according to claim 4, wherein the resin coating has a thickness in a range of 8 μm to 13 μm.

8. The optical film composite according to claim 4, wherein the binder is selected from the group consisting of acrylic resin, polyamide resin, epoxy resin, fluorocarbon resin, polyimide resin, polyurethane resin, alkyd resin, polyester resin, and a mixture thereof.

9. The optical film composite according to claim 4, wherein the particles are organic particles selected from the group consisting of acrylic resin, styrene resin, urethane resin, silicone resin, and a mixture thereof; or inorganic particles selected from the group consisting of zinc oxide, titania, zirconia, alumina, silica, bismuth oxide, zinc sulphide, barium sulphate, and a mixture thereof; or, a mixture of both.

10. The optical film composite according to claim 4, wherein the particles have a diameter in a range of about 1.5 μm to about 10 μm.

11. The optical film composite according to claim 1, wherein the intermediate member is an adhesion layer, for adhering the brightness enhancement element and the light diffusion element.

12. The optical film composite according to claim 1, wherein the optical adhesive is selected from the group consisting of silicone resin, acrylic resin, polyester resin, polyether resin, polyurethane resin, epoxy resin, and a mixture thereof.

13. The optical film composite according to claim 1, wherein the optical adhesive is a pressure-sensitive adhesive (PSA).

14. The optical film composite according to claim 1, wherein the brightness enhancement element is a light concentrating film, a multi-layered reflective polarized light recycling film, a chiral-nematic liquid crystal brightness enhancement film, or a wire-grid polarizer (WGP).

15. The optical film composite according to claim 14, wherein the brightness enhancement element is a light concentrating film, and the light concentrating film comprises a substrate and an optical structure layer located on the substrate.

16. The optical film composite according to claim 15, wherein the optical structure layer comprises a plurality of microstructures having light concentrating effect.

17. The optical film composite according to claim 16, wherein the microstructures are selected from the group consisting of columnar structures, conical structures, solid angle structures, orange-segment like structures, lens-like structures, capsule-like structures, and a combination thereof.

18. The optical film composite according to claim 16, wherein the microstructures comprise columnar structures, and at least two of the columnar structures are not parallel to each other.

19. The optical film composite according to claim 18, wherein the columnar structure comprises a prism columnar structure, an arc columnar structure, or a combination thereof.

20. The optical film composite according to claim 19, wherein a curvature radius at the highest point of the curved surface on the top of the arc columnar structures is in a range of 2 μm and 50 μm.

21. An optical film composite, comprising a light diffusion element, an intermediate member and a brightness enhancement element in sequence from a light incident surface, wherein:

the light diffusion element comprises a substrate having light diffusion layers at both sides thereof, the light diffusion layer is a resin coating having a concave-convex microstructure, the resin coating contains particles and a binder, and the content of the particles is 280-400 wt %, based on the weight of the binder, and the light diffusion element has a haze of no less than 98% as measured according to JIS K7136 standard method;

the intermediate member has a thickness in a range of 0.5 μm to 250 μm wherein the intermediate member is an optical adhesive, and the optical adhesive has a transmittance higher than 90% and a refractive index in a range of 1.4 to 1.6; and the brightness enhancement element is a light concentrating film, the light concentrating film comprises a substrate and an optical structure layer located on the substrate, and the optical structure layer comprises a plurality of arc columnar structures.

22. The optical film composite according to claim 21, where a curvature radius at the highest point of the curved surface on the top of the arc columnar structures is in a range of 5 μm to 12 μm.

23. A direct type back light module comprising the optical film composite according to claim 1 or 21.

24. A direct type back light module according to claim 23, which is a direct type LED back light module.

* * * * *